United States Patent [19]

Newhouse et al.

[11] Patent Number: 5,177,803
[45] Date of Patent: Jan. 5, 1993

[54] COAXIAL OPTICAL FIBER COUPLER TRANSMITTER-RECEIVER APPARATUS AND METHOD OF MAKING SAME

[75] Inventors: Mark A. Newhouse; David L. Weidman, both of Corning, N.Y.

[73] Assignee: Corning Incorporated, Corning, N.Y.

[21] Appl. No.: 692,493

[22] Filed: Apr. 29, 1991

[51] Int. Cl.⁵ .......................... G02B 6/26; H04J 1/00; C03B 23/20; G01B 9/02

[52] U.S. Cl. ........................................ 385/43; 385/42; 385/44; 385/126; 385/127; 385/88; 385/89; 385/33; 359/154; 359/121; 359/173; 65/4.1; 65/4.2; 65/12; 356/345

[58] Field of Search .................... 385/14, 27, 28, 42, 385/43, 44, 126, 127, 33, 128, 88, 89; 359/173, 154, 120, 121, 115; 65/4.1, 4.2, 4.21, 12; 356/345

[56] References Cited

U.S. PATENT DOCUMENTS

| | | | |
|---|---|---|---|
| 4,237,550 | 12/1980 | Steensma | 385/126 |
| 4,252,403 | 2/1981 | Salisbury | 385/127 |
| 4,266,851 | 5/1981 | Salisbury | 385/127 |
| 4,436,368 | 3/1984 | Keck | 385/127 |
| 4,465,335 | 8/1984 | Eppes | 385/127 |
| 4,493,113 | 1/1985 | Forrest et al. | 359/173 |
| 4,704,151 | 11/1987 | Keck | 65/4.1 |
| 4,709,413 | 11/1987 | Forrest et al. | 359/152 |
| 4,799,949 | 1/1989 | Keck et al. | 65/3.12 |
| 4,877,300 | 10/1989 | Newhouse et al. | 385/43 |
| 4,943,134 | 7/1990 | Nelson | 385/50 |
| 4,986,629 | 1/1991 | Augé et al. | 385/127 |
| 5,121,452 | 6/1992 | Stowe et al. | 385/43 |

FOREIGN PATENT DOCUMENTS

| | | | |
|---|---|---|---|
| 0213778 | 3/1987 | European Pat. Off. | 385/43 X |
| 2179171A | 2/1987 | United Kingdom | 385/43 X |
| 2183866A | 6/1987 | United Kingdom | 385/43 X |

OTHER PUBLICATIONS

J. R. Cozens; "Coaxial Optical Coupler"; Electronics Letters; Feb. 4, 1982, vol. 18, No. 3, pp. 138-140.
A. C. Boucouvalas; "Biconical Taper Coaxial Optical Fibre Coupler"; Electronics Letters; Sep. 12, 1985, vol. 21, No. 19, pp. 864-865.
Lacroix et al.; "All-Fiber Wavelength Filter from Successive Biconical Tapers"; Optics Letters; Oct. 1986, vol. 11, No. 10, pp. 671-173.
A. C. Boucouvalas; "Concatenated, Tapered Coaxial Coupler Filters"; IEE Proceedings; vol. 134, Pt. J, No. 3, Jun. 1987, pp. 191-195.
Jedrzejewski et al.; "Tapered-Beam Expander for Single-Mode Optical-fiber Gap Devices"; Elects. Ltrs., Jan. 16, 1986, vol. 22, No. 2, pp. 105-106.

Primary Examiner—Brian Healy
Attorney, Agent, or Firm—K. McNeill Taylor, Jr.

[57] ABSTRACT

An optical two-way transmission-received communications system utilizing a coaxial coupler in place of a standard coupler, the optical system being capable of operation either in a single or multiple wavelength mode by designing the coupling region to have the proper length (i.e., either in 3dB or WDM operation), and further comprising a transmitter and a detector adjacent a coaxial coupler. The detector of the system is provided with a hole in its center in order to allow the transmitter access to the core waveguide of the coaxial coupler. The coaxial coupler may be formed from a rod in tube structure with a core waveguide extension adjacent the Tx/Rx and an integral pigtail on the opposite side of the coupler.

32 Claims, 4 Drawing Sheets

COAXIAL OPTICAL FIBER COUPLER TRANSMITTER-RECEIVER APPARATUS AND METHOD OF MAKING SAME

FIELD OF THE INVENTION

The present invention relates to two-way optical communication systems, and more particularly to a transmitter-receiver apparatus comprising coaxial coupler means and a novel coaxial coupler design and manufacturing process.

BACKGROUND OF THE INVENTION

A key component of two-way optical transmission systems is the transmitter-receiver (Tx/Rx) package. Such packages are currently fabricated with 1×2 or 2×2 couplers in combination with standard transmitters, such as laser diodes or in some applications, light emitting diodes, and standard receivers, such as PIN diodes. The couplers of these systems are generally of two types:

(a) Wavelength Division Multiplexing (WDM) couplers, utilized in two-wavelength systems generally as combiners, splitters and filters, or (b) 3 dB splitters employed in single wavelength transmission systems.

One of the drawbacks with using 3 dB splitters is the 3 dB power loss in both transmitted and received power.

Three embodiments of the standard coupler are currently commercially available. First, the fused biconically tapered fiber coupler is fabricated by fusing two fibers together and then drawing them to a smaller diameter to cause coupling. Second, the multiclad coupler is fabricated by placing two fibers in a tube and heating and drawing the tube and fibers to induce coupling. Third, planar devices, including geometrically split or coupled waveguide paths, are formed by ion exchange in glass or other photolithographic techniques.

The first and second embodiments have integral fiber pigtails for attachment to the transmitter and receiver, making integration into small, robust packages difficult. The aforementioned third embodiment typically includes fiber pigtails attached to the planar substrate. Some designs have been proposed for directly coupling the Tx and Rx to the planar substrate without intermediate pigtails. Such designs require only a pigtail for attachment to the optical fiber transmission link.

The subject invention replaces the standard couplers with coaxial couplers for the purpose of achieving compact coupling devices without pigtails between the coupler and the Tx or Rx. The present invention makes possible the fabrication of a compact Tx/Rx package. Further, one embodiment of this invention provides for a short fiber extension which can be aligned to a transmitter similar to current techniques for fiber-transmitter alignment in current Tx/Rx designs. Coaxial coupling also provides flexibility in design. The invention provides more facile transmitter-receiver separation as well as the integration of source-fiber lens configurations for improved coupling efficiency. Also, the invention makes possible greater options in connecting devices into the system, which improves the flexibility in overall system design.

Discussion of Related Art

In U.S. Pat. No. 4,709,413, issued to Forrest et al on Nov. 24, 1987, for "Bidirectional Fiber Optic Systems," a ring detector inserted in a GRIN rod lens is connected to an LED source. The end of the GRIN rod and ring detector are offset from a large core multimode transmission fiber, whereby the fiber can be utilized as a bidirectional transmission link.

Such an arrangement cannot be used with a single mode fiber, because the single mode fiber core would be too small. In addition, this system is very inefficient, since a large portion of the received light does not impinge upon the detector ring.

By contrast, the current invention resolves these disadvantages by the use of a coaxial coupling system. The ring detector of the invention is combined with the transmitter in the center adjacent to a multicore coupler.

Coaxial couplers can be classified as tapered or untapered. An untapered coaxial coupler is described by Cozens et al. in "Coaxial Optical Coupler," Electronics Letters, Vol. 18, No. 3, Feb. 4, 1982, pp. 138–140. A coaxial coupler structure is shown with an outer cladding layer designed to alter the coupling characteristics of the coaxial device and therefore enable switching or other modulation. The structure is cylindrically symmetrical and could therefore be simply joined to a conventional single-mode fiber.

In U.S. Pat. No. 4,943,134, issued to Nelson on Jul. 24, 1990, for "coupler," a central rod waveguide surrounded by a second tubular waveguide is described, wherein the waveguides comprise nonlinear refractive index material and support non-identical mode fields. The device may be used as a switch, as it exhibits two distinct output states for small changes in input power.

The central rod waveguide surrounded by a tubular waveguide is also disclosed in GB patent publication no. 2 179 171 A by Boucouvalas et al., published Feb. 25, 1987, for "Coaxial Optical Couplers." The coupler is tapered therein by means of oppositely-driven clamps, resulting in substantially total coupling from central to tubular waveguide. The purpose of this invention is to resolve waveguide phase matching and coupler length tolerance problems associated with using a "rod" and "tube" waveguide in a single fiber filtering device. Such problems are relaxed using a tapered coaxial coupler filter of high extinction ratio. The coaxial coupler of the '171 patent is produced from a single optical fiber having a rod in tube refractive index profile (FIG. 1). In sharp contrast, the coaxial coupler of the present invention comprises a rod structure inside a tubular structure, the two structures being integrally formed as they are fused together by heating.

Boucouvalas, et al. also describe a tapered coaxial coupler in "Biconical Taper Coaxial Optical Fibre Coupler," Electronics Letters, Vol. 21, No. 19, Sep. 12, 1985, pp. 864–65. In this article, a tapered coaxial coupler structure with the tapering technique of fused biconical couplers is applied to the problem of phase-matching in coaxial couplers. The structure is fabricated by tapering communication fibers with slightly depressed claddings.

Lacroix, et al., in "All-fiber Wavelength Filter from Successive Biconical Tapers," Optics Letters, Vol. 11, No. 10, October 1986, pp. 671–73, disclose successive biconical tapers in a single mode fiber having depressed cladding or matched cladding fibers to create a wavelength filter Power in the undesired wavelengths is coupled out at the tapers, and stripped out by the jacket of the fiber, in order to create a narrow-bandpass filter. There is no teaching that tapering can be utilized for optical transmission/receiving coupling, as taught by the present invention.

Boucouvalas, et al., in "Concatenated, Tapered Coaxial Coupler Filters," IEEE Proceedings, Vol. 134, Pt. J, No. 3, June 1987, pp. 191-195, disclose successive tapered coaxial couplers used to create narrowband wavelength filters.

In GB patent publication no. 2 183 866, by Georgiou, et al., an optical fiber filter with two or more biconical tapers is shown in a coaxial optical fiber. By contrast with the present invention, this filter device does not couple the "rod" and "tube" portions of a coaxial coupler for the purposes of optical, two-way communication.

In European Patent Application, Publication No. 0 13 778, by Boucouvalas, et al., published Mar. 11, 1987, for "Interferometers," a coaxial coupler structure with two tapered regions is shown for use as a Mach Zehnder interferometer. A single fiber is spliced at the beginning and at the end of the structure (col. 3, lines 12-16).

It can be seen from the foregoing references that the prior art addresses filtering and switching issues as they relate to wavelength division multiplexing (WDM). As described hereinbelow, the scope of the present invention includes WDM (0/100) splitting as well as 3 dB (50/50) splitting. In addition, the present invention provides an optical, two-way transmission/receiving system utilizing coaxial coupling in place of the standard coupling now in use.

SUMMARY OF THE INVENTION

In accordance with one aspect of the present invention, there is provided an optical two-way Tx/Rx communications system utilizing a coaxial coupler in place of a standard coupler. The optical system can operate either in a single or multiple wavelength mode by designing the coupling region to have the proper length (i.e., either in 3 dB or WDM operation). The invention comprises a transmitter and a detector that are adjacent a coaxial coupler. The detector of the system is provided with a hole in its center in order to allow the transmitter access to the core waveguide of the coaxial coupler. Such detector means may comprise a ring detector or a number of detectors arranged adjacent sections of the ring waveguide. Light being transmitted through the system is receivable from the light coupled into the ring waveguide. The hole in the detector is designed to minimize blocking of the core light, while maximizing capture of light from the ring. In a preferred embodiment, the coaxial coupler is tapered in a midportion thereof, and features a core extension projecting through the hole in the detector to reduce near-end optical crosstalk. A standard communications fiber can be coupled to an end of the coupler fiber to complete the communication linkage. A lens disposed between the transmitter and the coaxial coupler provides source-to-core coupling. The lens can be any one of a variety of available lenses, such as molded, GRIN, spherical, etc. The preferred lens is a tapered or differentially etched fiber lens formed in the fiber extension, if improved coupling efficiency is needed. If such improved coupling efficiency is not a specific goal, a simple fiber extension is all that is required for source-to-core coupling.

It is an object of the invention to provide an improved optical communications system.

It is another object of this invention to provide a two-way optical communications system utilizing a coaxial coupler.

It is a further object of this invention to provide a fiber-in-a-tube fabrication for a two-way communications coaxial coupler that provides a waveguide extension for coupling with a transmission/receiving system that integrates source-fiber lens configurations, as well as providing a two-way communications snap-on coupling (quick connect and disconnect) to the transmission/receiver system utilizing fiber optic connectors.

BRIEF DESCRIPTION OF THE DRAWINGS

A better understanding of the present invention and its objectives may be obtained by reference to the subsequent detailed description considered in conjunction with the accompanying drawings, in which.

For purposes of clarity and brevity, like elements will have the same designation and numbering throughout the figures.

DESCRIPTION OF THE PREFERRED EMBODIMENT

Generally speaking, the invention features apparatus for improving a two-way optical communication system. The apparatus of the invention utilizes a coaxial coupler in combination with a transmitter and a modified detector to provide a new Tx/Rx system. The apparatus uses a coaxial coupler that allows light to be coupled from the core or rod waveguide to the surrounding ring or tube waveguide, thus providing for spatial light separation as would a standard coupler used in such systems. The invention modifies the detector with a center hole wherein the core waveguide becomes accessible to the transmitter. In this manner, the detector is coupled to the light being transmitted through the system via the ring waveguide, and the transmitter is coupled to the core waveguide for light transmission.

The materials and components utilized in the invention are those used in standard two-way communication systems, unless indicated to contrary.

Figure 1A:
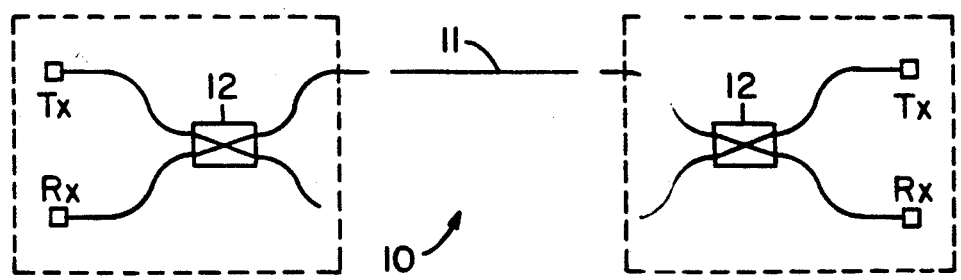
FIG 1a is a schematic view of a prior art optical communications system.

Now referring to FIG. 1a, there is shown a schematic diagram of a prior art two-way optical communication system 10. The communication system 10 comprises a transmitter-receiver (Tx/Rx) on each end of a standard optical fiber 11. A standard coupler 12 is used on each end of the fiber link to couple the light signal (source) from the Tx to the optical fiber and from the optical fiber to the Rx.

Figure 5A:
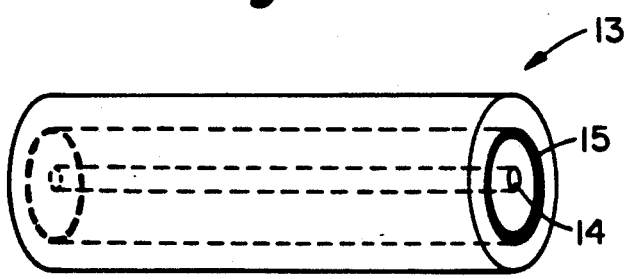
FIG. 5a is a schematic view of a typical coaxial coupler fiber generally utilized as a filter in wavelength division multiplexing.

The invention replaces the standard coupler 12 with a coaxial coupler. A typical coaxial coupler fiber 13 is shown in FIG. 5a. Such a fiber has been used as a filter in wavelength division multiplexing (WDM) systems, as disclosed in the aforementioned article titled "Coaxial Optical Coupler" by Cozens et al.

The fiber 13 comprises a central rod or core waveguide 14 surrounded by a tube or ring waveguide 15, as shown. The coaxial coupler 13 allows light to be coupled from the core waveguide 14 to the ring waveguide 15, thus providing combination of light signals that are spatially separated and separation or splitting of light signals that we spatially combined, as illustrated. The coupler 13 as used in the invention is designed for strong mode or large modulation depth coupling between the ring waveguide 15 and the core waveguide 14. For example, in a WDM (0/100) splitting system, with incoming signal light at 1310 and 1550 nm in core waveguide 14, a light signal having a wavelength of 1310 nm may be output by core waveguide 14 while light having a wavelength of 1550 nm may be output by ring waveguide 15.

The use of the coaxial coupler 13 in the communications system 10 of FIG. 1a, requires that a modification be made in the detector (Rx).

Figure 1:
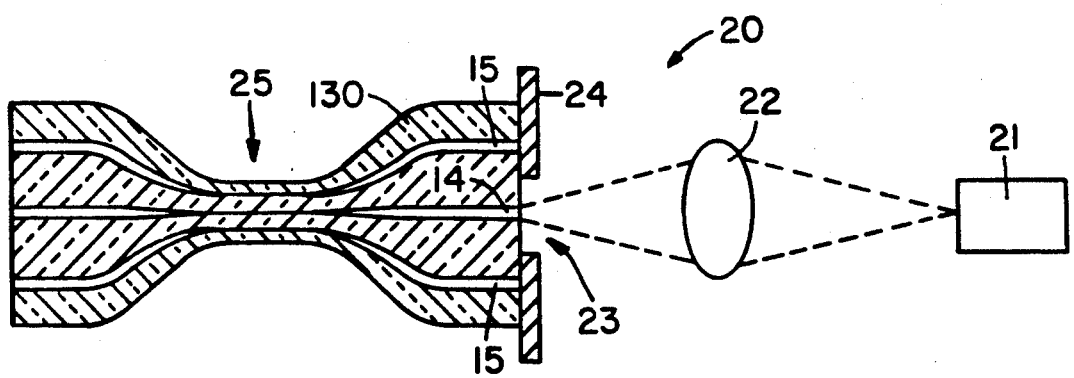
FIG. 1 is a schematic view of one embodiment of the invention.
Figure 5B:
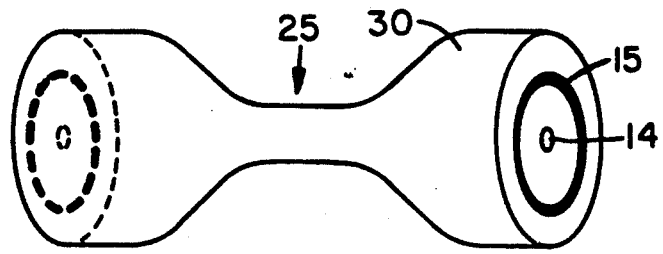
FIG. 5b is a schematic view of a tapered coaxial coupler fiber as can be utilized in a Tx/Rx package of the present invention, as shown in FIG. 1.

Referring to FIG. 1, one embodiment of a two-way optical coupling apparatus 20 of this invention is illustrated. The apparatus 20 comprises a transmitter 21 that directs light to a lens 22. The lens 22 focuses and directs the light to the core waveguide 14 of the coaxial coupler 30. For purposes of illustration, the particular coaxial fiber coupler depicted in FIG. 5b is used in the present discussion. It should be understood, however, that any of the coaxial coupler designs of the present invention could be used in any of the embodiments with suitable modifications for a particular Tx/Rx design.

The light is transmitted through a hole 23 placed in the detector 24. The detector 24 has been modified with a hole in its center for this purpose. The detector 24 is butted against the coaxial coupler 30 with hole 23 centered about the central rod or core waveguide 14. The detector 24 receives light from the two-way communications system via the tube or ring waveguide 15. The coaxial coupler fiber 30 is tapered in midportion 25 to increase the coupling between the core waveguide 14 and the ring waveguide 15.

The size of hole 23 in detector 24 is designed to carefully minimize blocking of the transmission (core) mode, while maximizing light capture in the ring waveguide 15. The diameter of the ring waveguide 15 can be widened to allow greater spatial output light separation between the ring waveguide 15 and the core waveguide 14. The lens 22 can be one of a variety of lens configurations, such as molded, GRIN, spherical, etc., that will provide the source-to-core coupling, or it can be replaced by a lens formed in the fiber extension (see lens 54 in FIG. 3) by tapering or differential etching.

In designing the apparatus 20, packaging requirements dictate that efficient optical coupling to the core be counterbalanced by sufficient separation between the detector 24 and transmitter 21 to provide electrical isolation.

Another consideration for the design of apparatus 20 is governed by the phenomenon of near-end optical crosstalk, which is the amount of optical signal sent by the transmitter 21 that is detected by the receiver 24.

Two different mechanisms may be used to provide the coupling required in a coaxial coupler. One of these is referred to as "$\beta$-matching" and the other is nonadiabatic mode coupling.

$\beta$-matching is described in the aforementioned references by Cozens et al. (Electronics Letters, Vol. 18) and references therein. These references describe the equations for coupling in coaxial couplers and the conditions under which $\beta$-matching can occur. While they are referenced specifically to the case of a tapered fiber, the same mathematics, with suitable modifications, describe the operation of a fiber in a tube device. With this mechanism, the propagation constants of the core mode, $\beta_1$, and that of the ring mode, $\beta_2$, are matched by controlling the combination of index profile and geometry. In the case of an untapered device, the desired coupling is achieved by simply choosing the correct length for the device. In the case of a tapered device, where the geometry changes continuously from one end of the device to the other, the equations of the above-mentioned references must be (numerically) integrated over the taper in order to correctly model the behavior.

The other mechanism which can be used to provide coupling is nonadiabatic tapering, which is applicable only to tapered devices. In this case, the angle of the taper is made steep enough so that it produces intermodal coupling. In the above description of $\beta$-matching, a tacit assumption was made that the taper was gentle enough so that nonadiabatic mode coupling would not occur. Obviously the two mechanisms could be combined, if desired.

Nonadiabatic mode coupling has traditionally been viewed as undesirable because it was expected to couple power out of the modes of interest and into other modes, resulting in loss. U.S. Pat. No. 4,877,300, issued Oct. 31, 1989, and assigned to the assignee of the present invention, however, shows that a tapered device can be designed so that controlled mode coupling to desired modes can occur. That patent describes conditions under which a taper is nonadiabatic and a design procedure for producing a suitable connector using nonadiabatic tapering. By using such a connector, power may be coupled out of the fundamental mode by nonadiabatic mode coupling, but may be coupled back into that mode at the output end of the tapered device. It is also possible, however, to design a nonadiabatically tapered coaxial coupler in which any desired splitting of the optical input can be obtained, using the general design principles described in Pat. No. 4,877,300.

In general, coaxial coupler configurations have certain advantages for Tx/Rx applications. Clearly, the two light conduits, central rod waveguide 14 and tubular waveguide 15, are adequately separated at one end of the structure (e.g., near detector 24) while only a small separation between fiber 14 and tube 15 exists at midportion 25, where coupling occurs. Moreover, a coaxial coupler is easily connectable to a transmission fiber, especially when an integral pigtail is provided for that purpose, as described hereinbelow.

The inventive coupling device can be used to operate at two wavelengths of light signal (e.g., 1310 nm and 1550 nm) with 0/100 WDM splitting or any ratio from 0:100 to 100:0, depending upon the application and other special design requirements. The inventive coupling device can also be used in a 3 dB system in which light
wavelengths are equal (e.g., 1310 nm and 1310 nm), in which case 50/50 splitting is preferred, although other ratios are again possible.

Figure 5C:
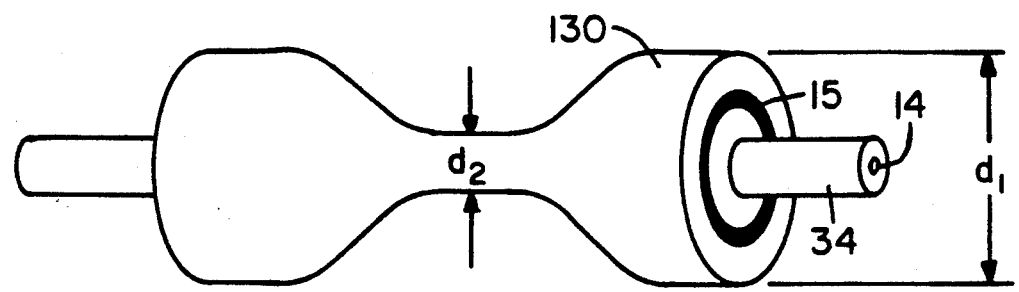
FIGS. 5c and 5d are schematic views of tapered coaxial couplers with core extension.

A coaxial coupler preform may be formed by threading a fiber 34 through glass overclad tube 130 (FIG. 5c). Whereas those portions of the fiber extending from the tube on the side opposite the attachment to the Tx/Rx preferably have protective coating material (not shown), those portions thereof within the tube have no coating. The original diameter of the tube is $d_1$, and is approximately 2.5 to 3.0 millimeters. The midregion of the coupler preform is evacuated and heated to collapse it onto the fiber. The tube is further heated and the ends thereof are pulled in opposite directions to increase the tube length and reduce its diameter. The combined rate at which the two tube ends move away from each other constitutes the stretch rate. The central portion of the stretched midregion constitutes a neckdown region of minimum diameter $d_2$ where the core and ring waveguides are sufficiently closely spaced for a sufficient distance to effect the desired coupling therebetween. The draw ratio or taper ratio, equal to $d_1/d_2$, is an important parameter in determining the optical characteristics of the particular device being made. A typical taper ratio is approximately in a range from 3:1 to 10:1. The duration of the heating period for the stretch step is shorter than that for the tube collapse step, since only the central portion of the midregion is stretched.

The above-described coaxial coupler can be fabricated by a technique similar to that described in the article, "Tapered-Beam Expander for Single-Mode Optical-Fiber Gap Devices," Electronics Letters, 16th January 1986, Vol. 22, No. 2, pp. 105–106, by K. P. Jedrzejewski et al. A length of single-mode fiber is selected to provide the desired pigtail lengths. After the coating is stripped from a central portion of the fiber, it is threaded through a glass capillary tube, and the stripped portion of the fiber is centered in the tube. The tube has a lower softening point temperature and a lower refractive index than the fiber cladding. The tube is collapsed onto the fiber by heating the tube to its softening point. The method and apparatus described in U.S. Pat. No. 4,799,949, issued Jan. 24, 1989, and hereby incorporated by reference, may be employed to stretch the central portion of the collapsed tube, thereby forming tapered regions and small diameter regions.

In addition to the fiber in tube fabrication method, the coaxial coupler may be fabricated by tapering a fiber which includes a ring waveguide in addition to a core waveguide or by designing such a fiber so that coupling exists without tapering.

Figure 6:
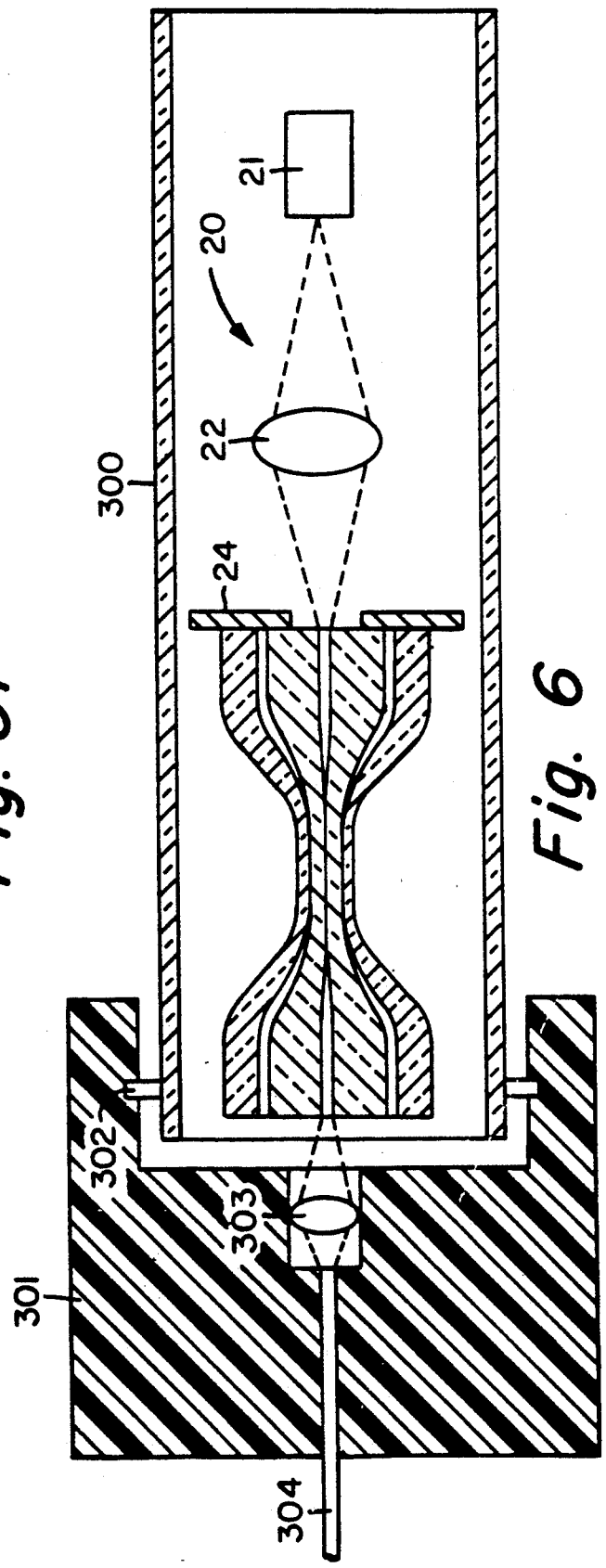
FIG. 6 is a schematic view depicting the invention coupled to an optical communication system using connector means.

The inventive fiber-in-tube manufacturing process provides many important benefits for coaxial couplers in general, including but not limited to coaxial couplers for use in compact Tx/Rx systems. The inventive process provides for ease of manufacture, using conventional fiber with a specially designed tube or a specially designed fiber with a tube of uniform composition and refractive index. The structure is robust with extra material in the necked down coupling region. The process allows an integral pigtail for attachment to the transmission fiber thus eliminating the need for pigtail attachment by gluing or fusing, or precision active alignment by other means. Also, the fiber-in-the-tube coupler may be matched with the system fiber. Finally, as described below, the inventive fiber-in-the tube design may be readily used to form a waveguide extension for coupling with a Tx/Rx on the side of the coupler opposite the transmission link. Fiber-in-the-tube construction has a very practical benefit in coupling the transmission line to the transmission/receiver system with fiber optic connectors, as illustrated in FIG. 6.

Figure 2:
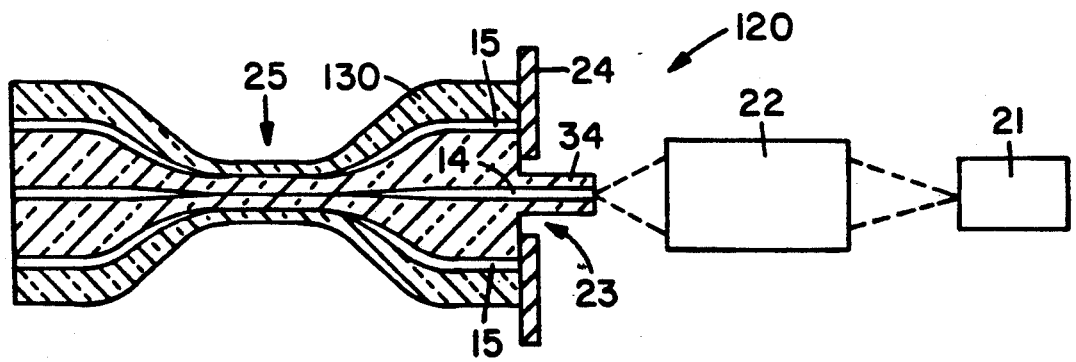
FIG. 2 is a schematic view of a second embodiment of this invention.

Referring to FIG. 2, a second, preferred embodiment of the invention is illustrated by apparatus 120, which comprises the coaxial coupler 130. The coupler 130 is characterized by a core extension 34 which extends the core and at least a thin layer of cladding beyond the end of the ring waveguide.

The core extension may be fabricated in at least two ways. In one embodiment, a coaxial coupler fiber may be etched at its end. By using a suitable mask during the etching step, the fiber core and immediately surrounding cladding are unaffected while the remainder of the surrounding structure, including the ring waveguide, is removed.

A second fabrication method for the coaxial coupler involves the use of fiber in tube method where the ring waveguide is included in the tube. The higher index region ring waveguide may be positioned on the inside of the tube so that it abuts the cladding of fiber 14, thus forming the ring waveguide. The extension of the fiber 14 past the end of the tube 130 can then be used as a pigtail for attachment to the transmission line and, on the opposite side, as an extension for alignment with the Tx. Another operational advantage of the core waveguide and cladding extension 34 is that optical and electrical crosstalk are greatly reduced or eliminated, facilitating the launching of light signals into the ring waveguide 15. Thus, Tx and Rx can be separated, resulting in minimal electrical crosstalk.

Again referring to FIG. 2, the transmitter 21 transmits light to a GRIN lens 22, that directs the light to core extension 34. The apparatus 120 is particularly useful when surface scattering from the laser launch contributes too large a signal at detector 24, which is a source of so-called "near-end" optical cross-talk. The continuation of the core 14 through hole 23 via core extension 34 corrects for this situation.

Figure 3:
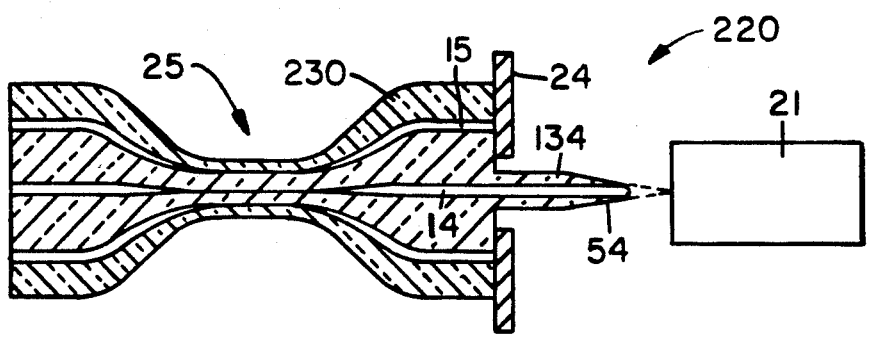
FIG. 3 is a schematic view of a third embodiment of the invention.

Referring to FIG. 3, a third embodiment of the invention is depicted by apparatus 220. The apparatus 220 comprises the coaxial coupler 230. The coupler 230 features an extension 134. In such an arrangement, it is useful to lens the end 54 of extension 134. A lens (either conventional or Fresnel-type) can be formed on end 54 of extension 134 by means of chemical etching, grinding, or a thermal process provided by electrical, flame or laser heating.

Figure 4:
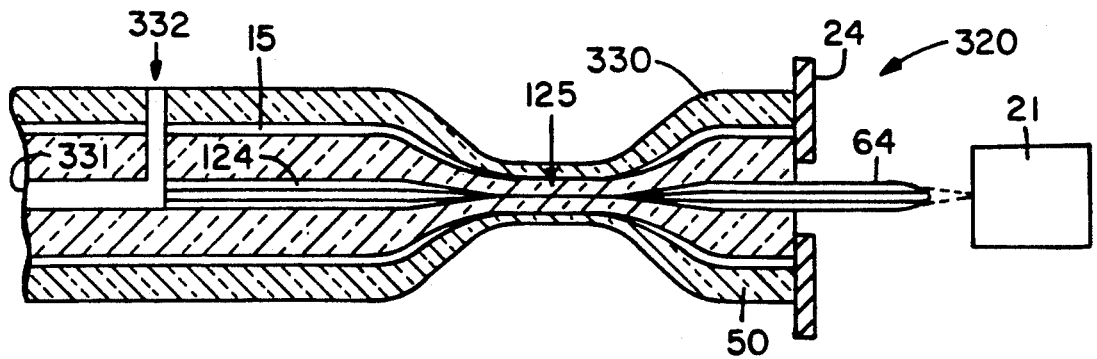
FIG. 4 is a schematic view of a fourth embodiment of the invention.

Referring to FIG. 4, a fourth embodiment of this invention is illustrated by apparatus 320. The apparatus 320 is characterized by a coupler 330, which includes a waveguide fiber 124, and ring waveguide 15, disposed within the cylindrical cladding 50. The coupler 24 may have an etched, lensed end 64. The ring waveguide 15 and waveguide fiber 124 are tapered (portion 125) to achieve the proper coupling. Apparatus 320 has the advantage of being mechanically spliceable in the field. An optical fiber is inserted in receiving cylinder 331, while vent hole 322 provides relief for gases, glue or index matching fluid which may be present in receiving cylinder 331. A tapered port may be provided at the outside end of receiving cylinder 331 for ease of fiber insertion. This device is utilized similarly to a capillary splice.

Figure 5D:
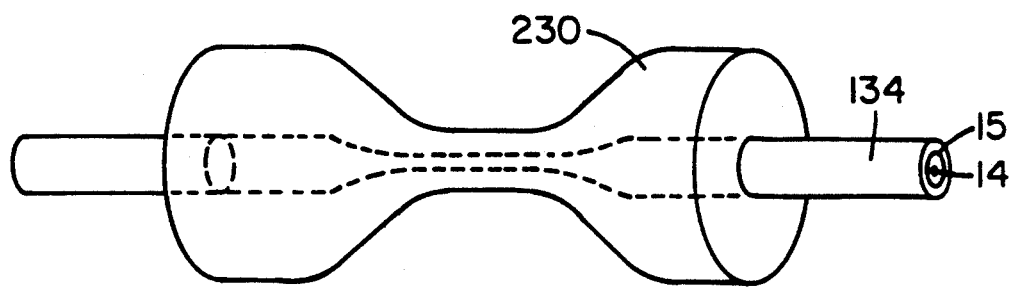

Referring to FIG. 5d, the tapered waveguide coupler 230 is similar to that shown in FIG. 5c, with the exception that the core waveguide 14 and the ring waveguide 15 are formed within a core member 134.

Figure 5E:
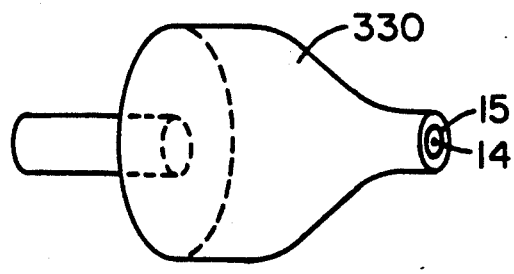
FIG. 5e depicts a schematic view of an alternate embodiment of a coupler shown in FIG. 5d, severed in the necked down region.

Referring to FIG. 5e, there is shown a tapered coaxial coupler such as the couplers depicted in FIGS. 5c or 5d that has been severed in its neck down region. Such a device may be used to provide a coupler with different mode field diameters at its two ends (Tx/Rx and System).

Figure 5G:
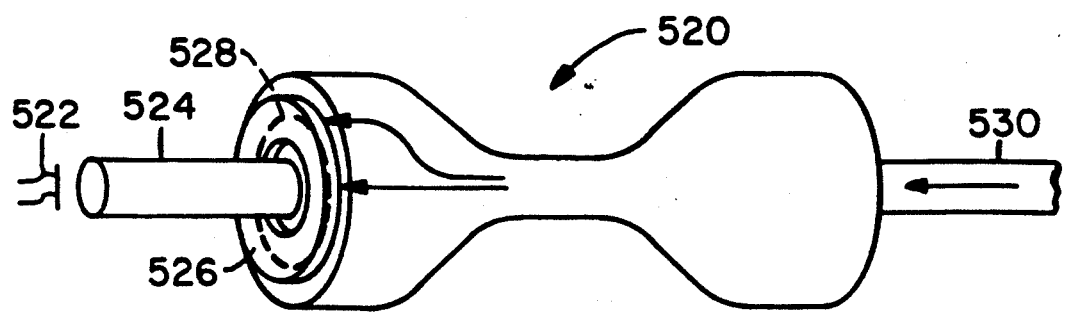
FIG. 5g is a schematic view of a coaxial coupler used as a WDM receiver.
Figure 5F:
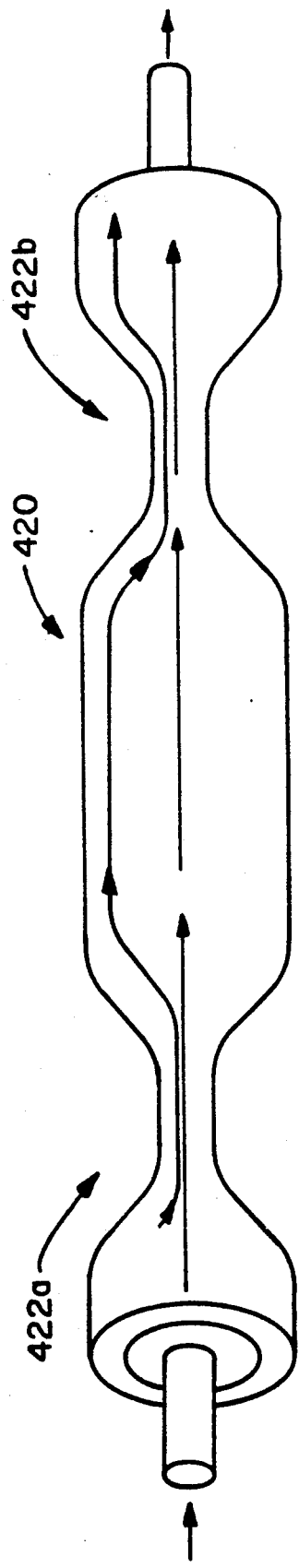
FIG. 5f is a schematic view of coaxial couplers used to form a Mach Zehnder interferometer.

Referring now to FIG. 5f, there is shown a coaxial device 420 having two spaced apart 3 dB couplers 422a, 422b, forming a Mach Zehnder interferometer, which application is still within the scope of the present invention. It can be seen that a light signal applied to the core waveguide at the leftmost end of device 420 is caused to partially couple at the midportion of the first coupler 422a, thereby being split into two signals, which, in a preferred embodiment, are of roughly equal intensity. The resulting signals are again coupled at the second coupler 422b, so as to provide the interferometer function. An important application for such a Mach Zender device is a wavelength division multiplexer which can separate signals that are closely spaced in wavelength, on the order of 1 nm or less.

Referring now to FIG. 5g, there is shown a schematic view of a coaxial coupling device 520 used in a WDM system. Coupler 520 has a first detector 522 proximately disposed with respect to the central rod waveguide 524 and a second detector 526 proximately disposed with respect to the ring waveguide 528. Detectors 522 and 526 are adapted to receive signals carried by transmission line 530 and separated according to wavelength by coupling device 520. By removing detector 526, device 520 functions as a filter.

The respective coupling apparatus 20, 120 and 220, shown in FIGS. 1 through 3, can be placed in a standard connector jacket 300, as shown in FIG. 6. Using fiber optic connectors with housing 301 and clip means 302 makes the invention rapidly mountable (quick connect and disconnect) within a communication system (lens 303 and optical fiber 304 are also depicted).

The advantages of the invention are many and include the achievement of a communication system without pigtails between the coupling device and the Tx/Rx. The invention also provides a coupling system that has more flexibility in transmitter-receiver separation. The invention can also integrate source-fiber lens configurations and provide more flexibility in couplers for communication system connections.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A coupling apparatus for a two-way optical communications system, comprising:
    a coaxial coupler having a core waveguide surrounded by a ring waveguide;
    detector means disposed adjacent said coaxial coupler for receiving light transmissions from said ring waveguide and having hole means therein for accessing said core waveguide of said coaxial coupler to light transmissions from a transmitter; and
    a transmitter disposed adjacent said detector and said coaxial coupler for directing light transmissions to said core waveguide of said coaxial coupler.

2. The coupling apparatus for a two-way optical communications system in accordance with claim 1, wherein said coaxial coupler is tapered in a midportion thereof.

3. The coupling apparatus for a two-way optical communications system in accordance with claim 1, wherein said coaxial coupler is tapered in an endportion thereof.

4. The coupling apparatus for a two-way optical communications system in accordance with claim 2, wherein said coaxial coupler includes a core waveguide extension.

5. The coupling apparatus for a two-way optical communications system in accordance with claim 4, wherein said core waveguide extension of said coaxial coupler has a lens formed on its end.

6. The coupling apparatus for a two-way optical communications system in accordance with claim 1, further comprising a lens disposed between the transmitter and the core waveguide of the coaxial coupler.

7. The coupling apparatus for a two-way optical communications system in accordance with claim 6, wherein said lens is selected from a group of lenses consisting of molded, GRIN and spherical lenses.

8. The coupling apparatus for a two-way optical communications system in accordance with claim 1, disposed within a mounting connector.

9. The coupling apparatus for a two-way optical communications system in accordance with claim 2, wherein said coaxial coupler includes an extension that is etched.

10. A method of fabricating a coaxial optical coupler comprising the steps of:
    a) disposing a rod-like core member in a tube; and
    b) collapsing said tube upon at least a portion of a length of said rod-like core member to form a coaxial coupler comprising a core waveguide inside a ring waveguide; said core member comprising at least a raised refractive index part of said core waveguide and at least a portion of said tube comprising a raised refractive index part of said ring waveguide and a lower refractive index part of said ring waveguide.

11. A method of fabricating a coaxial optical coupler from a coated optical fiber and a tube, comprising the steps of:
    a) stripping the coating from at least a portion of the fiber;
    b) disposing a rod-like stripped portion of said optical fiber in said tube; and
    c) collapsing said tube upon at least a portion of a length of said rod-like stripped portion to form a coaxial coupler comprising a core waveguide inside a ring waveguide;
    said rod-like stripped portion comprising at least a raised refractive index part of said core waveguide and at least a portion of said tube comprising a glass having a refractive index less than that of said raised refractive index part of said core waveguide.

12. The method of claim 11 wherein said disposing step further comprises the step of inserting the stripped portion of said optical fiber into said tube so that an extension of the stripped fiber protrudes from an end of the tube.

13. The method of claim 12 wherein said optical fiber includes an unstripped length and wherein said disposing step further comprises the step of inserting said fiber such that an integral pigtail to said coaxial coupler remains after said collapsing step.

14. The method of claim 10 wherein said tube includes said ring waveguide.

15. The method of claim 10 wherein said core member comprises said core waveguide and at least a raised refractive index part of said ring waveguide.

16. The method of claim 12 further comprising the step of forming the end of said extension into a lens.

17. The method of claim 10 further comprising the step of etching one end of said coaxial optical coupler after said collapsing step to form an extension which includes a portion of said core waveguide.

18. The method of claim 10 further comprising the step of tapering at least a portion of said coaxial optical coupler to form a neckdown region for effecting a desired coupling.

19. The method of claim 18 wherein said tapering step further comprises the step of heating and stretching a midregion of said coaxial optical coupler to form tapered regions on each side of said neckdown region.

20. A coaxial optical coupler having a core waveguide inside a ring waveguide, said core waveguide including a central core region surrounded by a cladding having a lower refractive index, said ring waveguide including a region of raised refractive index between an inner and an outer coaxial annulus of lower refractive index, comprising:
a tube, including a first radial tube portion comprising at least a portion of said region of raised refractive index and of said outer coaxial annulus of said ring waveguide; and,
a core member, including a first axial segment disposed inside said tube, said core member comprising at least a first radial core portion of said central core region;
said tube and said core member being integrally formed as a rod structure and a tube structure fused together by heating.

21. A coaxial optical coupler including a core waveguide inside a ring waveguide, comprising:
a tube, including a first radial tube portion comprising a glass having a refractive index less than that of a raised refractive index part of said core waveguide, said first radial tube portion forming at least a first radial portion of said ring waveguide; and,
a core member, comprising an optical fiber whose coating has been stripped from a first axial segment, said first axial segment being disposed inside said tube, said first axial segment comprising at least a first radial portion of said core waveguide;
said tube and said core member being fused together by heating at least within said coupling region.

22. The coaxial coupler of claim 21, wherein a portion of said optical fiber comprises an extension that protrudes from an end of said tube.

23. The coaxial optical coupler of claim 21 wherein said optical fiber includes an unstripped length which forms an integral pigtail for said coaxial optical coupler.

24. The coaxial optical coupler of claim 20 wherein said tube includes said ring waveguide.

25. The coaxial optical coupler of claim 24 wherein said core member comprises said core waveguide and at least a raised refractive index part of said ring waveguide.

26. The coaxial optical coupler of claim 22 wherein said extension further comprises a lensed end portion.

27. The coaxial optical coupler of claim 20 further comprising at least one taper and a neckdown region for effecting the desired coupling.

28. The coaxial optical coupler of claim 27 further comprising a taper on each side of said neckdown region, said neckdown region being in a midregion of said coaxial optical coupler.

29. The coaxial optical coupler of claim 28 further comprising a second neckdown region having tapers on each side thereof, and wherein said coaxial optical coupler forms a Mach-Zehnder interferometer.

30. The coaxial optical coupler of claim 27 further comprising means for attaching said neckdown region to an optical fiber to form a variable mode field coupler.

31. A coaxial optical coupler having a core waveguide inside a ring waveguide, said core waveguide including a central core region surrounded by a cladding having a lower refractive index, said ring waveguide including a region of raised refractive index between an inner and an outer coaxial annulus of lower refractive index, comprising:
a tube, including a first radial tube portion comprising at least a portion of said outer coaxial annulus of said ring waveguide; and,
a core member, including a first axial segment disposed inside said tube, said core member comprising at least a first radial core portion of said central core region;
said tube and said core member being integrally formed as a rod structure and a tube structure fused together by heating;
further comprising means for coupling said core waveguide to a transmitter and said ring waveguide to a detector to form a transmitter-receiver assembly for attachment to a bi-directional transmission link.

32. The coaxial optical coupler of claim 20 further comprising means for coupling said core waveguide to a first detector and said ring waveguide to a second detector to form a wavelength division multiplexer.

* * * * *